3,158,559
PROCESS FOR ISOMERIZATION OF OLEFINIC
HYDROCARBONS
James M. Caffrey, Jr., Wappingers Falls, N.Y., assignor to Texaco Inc., New York, N.Y., a corporation of Delaware
No Drawing. Filed July 12, 1961, Ser. No. 123,436
6 Claims. (Cl. 204—162)

This invention relates to the isomerization of olefins, and more particularly to isomerization effecting a shift in the double bond of 1-olefins having more than 3 carbon atoms in a molecule to a more centrally located position. In its more specific aspect, this invention relates to a conversion of 1-butene to 2-butene.

Double bond isomerization of olefinic hydrocarbons whereby the double bond is shifted from the alpha position to a more centrally located position is known in the art, and is useful in the production of improved motor fuels, and as a starting material in chemical synthesis. Isomerization conversion of the olefin is effected in the presence of a catalyst, and usually at high temperatures. Also, conversion of various hydrocarbons has been effectively achieved in more recent years by radiolysis. Upon exposure of the hydrocarbon fraction to irradiation, conversion of the hydrocarbon may result, the type of conversion reaction being dependent upon the feed stock, conditions employed, catalyst, etc. Known conversion reactions by reason of radiolysis include for example, hydrogenation, dehydrogenation, polymerization, alkylation, cracking, and so on. To the best of my knowledge, radiolysis of olefinic hydrocarbons has resulted in polymerization, irrespective of the catalyst, if any.

This invention has therefore as its purpose to provide a process for the double bond isomerization of 1-olefins whereby the double bond is shifted to a more centrally located position. As a further advantage, the process of this invention may be conducted at moderate temperatures.

Briefly, my invention involves a process for the double bond isomerization of 1-olefins which contain more than 3 carbon atoms per molecule. In accordance with my invention, the olefinic hydrocarbon is adsorbed by a molecular sieve adsorbent, and subjected to gamma irradiation. The resultant product exhibiting the double bond in a more centrally located position is subsequently desorbed from the molecular sieve adsorbent. The shift of double bond that occurs by reason of isomerization of the 1-olefin molecule takes place more often to an immediately adjacent position although some shift of the double bond can take place over a greater portion of the molecule.

The olefinic feed stock for the process may be derived from any suitable source including a pure olefin or mixture of olefins having more than 3 carbon atoms in the molecule. A certain percentage of paraffins or naphthenes may be present in the feed stock as impurities but preferably these impurities should be inert to the conversion reaction. However, paraffins are adsorbed by the molecular sieve adsorbent and may affect the sieve loading with a subsequent loss in adsorption of the olefins. The feed stock, therefore, desirably contains over 50% by weight, and preferably over 75% by weight, of 1-olefins having more than 3 carbon atoms per molecule. Although the invention is particularly adapted to the conversion of 1-butene to 2-butene, and is discussed below in detail, it should be understood that the process may be utilized for shifting of the double bond and other 1-olefins or alpha olefins to olefins in which the double bond is in a more centrally located position, and include for example, 1-pentene, 1-hexene, 1-heptene, 1-octene, etc. Although olefins having as many as 20 carbon atoms per molecule may be used in the practice of my invention, the higher molecular weight materials become progressively more difficult to adsorb, and therefore the invention is particularly suited to olefins containing 3 to 10 atoms per molecule.

The molecular sieve adsorbent employed in my invention comprises certain alumino silicates, such as calcium alumina silicate of inorganic materials in the form of porous crystals wherein the pores of the crystal are of molecular dimension and are of uniform size. A particular suitable adsorbent is calcium alumino silicate manufactured by Linde Air Products Company and designated Type 13Å molecular sieve, but other molecular sieve adsorbents may be used such as Type 5Å or Type 10Å. The crystals of these calcium alumino silicate materials, apparently actually a sodium calcium alumina silicate, have a pore size sufficient to admit the 1-olefins, the pore size or diameter for Type 13Å, for example, being about 13 Angstrom units. Molecular sieve adsorbents with the larger pore size, especially the Type 13Å molecular sieve, is particularly suited for adsorption of larger molecules and the branched chain molecules; and, equally important, the desorption step may be conducted more rapidly. This particular silicate adsorbent is available in various sizes such as $\frac{1}{16}''$ and $\frac{1}{8}''$ pellets as well as finely divided powder form.

In accordance with the process of the present invention, the 1-olefin is adsorbed on the molecular sieve adsorbent. The olefinic feed stock is contacted with the adsorbent at a suitable temperature, and preferably in the vapor phase. Adsorption is conducted at a temperature range between about 0° to 100° C., and preferably between about 5° to 40° C. Where temperatures higher than the described maximum are used, cracking, decomposition or other undesirable reactions may occur. Although the pressure employed is not particularly critical, pressures less than one atmosphere are desirable, but it may be more convenient and economical to conduct the process at atmospheric conditions. However, low superatmospheric pressures may be employed, for example 5 atmospheres or more. Where deemed desirable, the olefinic feed stream upon contact with the molecular sieve adsorbent may be maintained in a liquid phase, and under high pressure. Adsorption is continued until the molecular sieve adsorbent has adsorbed a predetermined quantity of olefins, desirably about 0.5 to 50 cc. gaseous olefins at standard temperature and pressure (S.T.P. measured at 0° C. and 1 atmosphere of pressure) per gram of adsorbent, and more preferably 1 to 30 cc. olefin (S.T.P.) per gram of adsorbent.

The adsorbed olefin is exposed to gamma-ray exposure dose usually at not less than about $.5 \times 10^6$ roentgens, and preferably about $4 \times 10^6$ to $50 \times 10^6$ roentgens. Where deemed desirable, a higher dosage of gamma-ray exposure may be employed, but there appears to be no benefit in exceeding about $100 \times 10^6$ roentgens. Any suitable source yielding gamma irradiation may be employed such as radioactive isotopes, nuclear reactor and electron accelerator. The dosage of gamma irradiation is dependent somewhat upon the amount of olefin adsorbed per gram of adsorbent, a higher dosage usually being required with increased amount of olefin adsorbate. Thus, for example, for the conversion of 1-butene to 2-butene, with the molecular sieve containing 1 cc. (S.T.P.) 1-butene as adsorbate per gram adsorbent, a dosage of about $28 \times 10^6$ roentgens resulted in approximately 98% double bond isomerization. However, when the 1-butene as adsorbate was increased to 30 cc. (S.T.P.) per gram adsorbent, the dosage of gamma irradiation required to effect about 90% isomerization was increased to about $50 \times 10^6$ roentgens. It is particularly advantageous and significant that isomerization by gamma irradiation of the adsorbed olefin may be conducted at moderate temperatures, e.g.

0° to 100° C., but lower or higher temperatures may be used.

The resultant product comprising the isomerized olefin adsorbed on the molecular sieve is desorbed or displaced therefrom by known conventional means. The molecular sieve material may be desorbed, for example, by water displacement whereby water is passed through the sieve generally at a temperature in the range of 15 to 30° C. The water, having a greater affinity for the sieve, displaces the olefinic hydrocarbon. The desorbed olefin containing some water may be passed to any suitable recovery unit to remove the water. The molecular sieve material may be regenerated as by heating and purging with an inert gas generally at a temperature of 150 to 250° C., and the regenerated sieve may be contacted with fresh feed stock.

In each of the following examples, which further illustrate my invention, adsorption tubes were packed with Linde 13Å molecular sieve adsorbent material. The packed adsorbent material was degassed by initially heating in a vacuum at a pressure of $10^{-5}$ mm. of mercury at 450° C. for 16 hours, and the degassed material then cooled to room temperature. The olefinic hydrocarbon in the gaseous phase was contacted with the molecular sieve adsorbent, and the amount of hydrocarbon adsorbed thereon was determined for each sample run. The adsorption tube was cooled in liquid nitrogen to facilitate hermetic sealing of the tube, and then warmed to room temperature. Except with control runs, each adsorption tube containing the adsorbed hydrocarbon was subjected to irradiation for a prescribed time from a cobalt 60 source.

Following irradiation, the adsorbate was desorbed from a molecular sieve adsorbent by water displacement desorption. Water employed in the desorption step was initially degassed by alternate freezing, opening to the vacuum system and warming. The degassed water was distilled, the vapors passed to the adsorption tube, and the desorbed hydrocarbon and excess water vapor were collected in a tube cooled by liquid nitrogen. After the desorption step was completed, the tube containing the desorbed product was allowed to warm to room temperature whereby the desorbed product expanded and transferred by a toepler pump through a Dry Ice trap to separate the olefinic hydrocarbon from the water. The hydrocarbon product recovered was measured, and a sample collected for analysis by vapor phase chromatography.

EXAMPLE I 1-butene, having a purity in excess of 99%, was adsorbed on the molecular sieve adsorbent, irradiated from a cobalt 60 source, desorbed from the sieve and the product analyzed, as described above. Table I below summarizes the conditions and results for the numerous runs, the table showing the conditions for adsorption, the dosage of irradiation and the percent conversion. Control runs A and B differed from the other runs only in that each control was not subjected to irradiation.

*Table I*

| Sample No. | Conditions for Adsorption | | | Irradiation Roentgens $\times 10^6$ | Product Distribution (wt. percent) | | | |
| --- | --- | --- | --- | --- | --- | --- | --- | --- |
| | Pressure, cm. of mercury | Temp., °C. | Vol. Gas Adsorbed per gram adsorbent, cc. (S.T.P.)/g. | | Cis-2-butene | Trans-2-butene | 1-butene | Others |
| Control A | <0.1 | 24.4 | 28.5 | None | None | None | 100 | None |
| Control B | <0.1 | 24.4 | 0.97 | None | None | None | 93.4 | [1] 6.6 |
| 1 | <0.1 | 23 | 1.00 | 24.9 | 41.5 | 52.5 | 1.9 | [1] 4.1 |
| 2 | 0.2 | 23 | 30.4 | 24.9 | 39.6 | 22.2 | 38.2 | None |
| 3 | 0.1 | 23 | 18.4 | 24.9 | 34.0 | 28.9 | 31.0 | [2] 6.1 |
| 4 | 5.4 | 23 | 48.3 | 24.9 | 49.5 | 17.2 | 33.4 | None |
| 5 | 0.1 | 23 | 8.03 | 4.72 | 18.6 | 16.0 | 65.2 | [1] 0.1 |
| 6 | <0.1 | 23.6 | 0.98 | 4.72 | 27.5 | 27.7 | 43.5 | [1] 1.3 |

[1] Ethane-ethene probably from external contamination.
[2] Ethane-ethene 5.5%, n-butane 0.6%.

EXAMPLE II

The procedure of Example I was repeated except 1-hexene, having a purity in excess of 99%, was substituted for the 1-butene. Table II below summarizes the conditions and results for the run.

*Table II*

| Sample No. | Conditions for Adsorption | | | Irradiation Roentgens $\times 10^6$ | Product Distribution (wt. percent) | |
| --- | --- | --- | --- | --- | --- | --- |
| | Pressure, cm. of mercury | Temp., °C. | Vol. Gas Adsorbed per gram adsorbent, cc. (S.T.P.)/g. | | Cis-2-hexene and Cis-3-hexene | Trans-2-hexene and Trans-3-hexene |
| 1 | <0.1 | 24 | 8.14 | 52.9 | 29.6 and 5.9 | 50.9 |

I claim:

1. A process for the double bond isomerization of 1-olefins having more than 3 carbon atoms in the molecule comprising adsorbing said 1-olefin on a molecular sieve adsorbent, gamma irradiating said adsorbed 1-olefin with not less than about $.5 \times 10^6$ roentgens, desorbing the molecular sieve adsorbent and recovering the resultant product.

2. A process according to claim 1 wherein said gamma irradiation is conducted at a temperature of about 0° to 100° C.

3. A process according to claim 1 wherein the source for said gamma irradiation is cobalt 60.

4. A process for the isomerization of 1-butene to 2-butene comprising adsorbing said 1-butene on a molecular sieve and gamma irradiating said 1-butene with not less than about $.5 \times 10^6$ roentgens, desorbing said molecular sieve and recovering 2-butene as the resultant product.

5. A process according to claim 4 wherein about 0.5 cc. to 50 cc. gaseous butene are adsorbed on said molecular sieve adsorbent per gram of said molecular sieve adsorbent.

6. A process according to claim 4 wherein said gamma irradiation is about $4 \times 10^6$ to $50 \times 10^6$ roentgens.

References Cited in the file of this patent

UNITED STATES PATENTS 2,956,941   Heath et al. _____ Oct. 18, 1960

FOREIGN PATENTS 842,136   Great Britain _____ July 20, 1960